US012415289B2

(12) United States Patent
Arkwright

(10) Patent No.: US 12,415,289 B2
(45) Date of Patent: Sep. 16, 2025

(54) HAND-HELD PIPE EDGE BEVELER WITH VACUUM ADAPTER

(71) Applicant: Chris Arkwright, Erie, PA (US)

(72) Inventor: Chris Arkwright, Erie, PA (US)

(73) Assignee: REED MANUFACTURING COMPANY, Erie, PA (US)

( * ) Notice: Subject to any disclaimer, the term of this patent is extended or adjusted under 35 U.S.C. 154(b) by 196 days.

(21) Appl. No.: 18/373,038

(22) Filed: Sep. 26, 2023

(65) Prior Publication Data

US 2025/0100172 A1 Mar. 27, 2025

Related U.S. Application Data

(63) Continuation-in-part of application No. 15/487,481, filed on Apr. 14, 2017.

(51) Int. Cl.
*B26D 3/02* (2006.01)

(52) U.S. Cl.
CPC .................................... *B26D 3/02* (2013.01)

(58) Field of Classification Search
CPC .. B26D 3/02; B23C 1/20; B23Q 11/00; B27C 5/10
See application file for complete search history.

(56) References Cited

U.S. PATENT DOCUMENTS

| | | | | |
|---|---|---|---|---|
| 4,674,548 A * | 6/1987 | Mills | B23Q 11/0046 | 144/154.5 |
| 7,290,967 B2 * | 11/2007 | Steimel | B23Q 11/0046 | 409/137 |
| 7,971,611 B1 * | 7/2011 | Wells | B27C 5/02 | 144/286.5 |
| 8,708,624 B1 * | 4/2014 | Marusiak | B27G 21/00 | 144/136.95 |
| D826,496 S * | 8/2018 | Witter | D32/31 | |
| 10,189,134 B2 * | 1/2019 | Brigolin | B23Q 11/0046 | |
| 10,449,689 B2 * | 10/2019 | Firth | B25F 5/021 | |
| 10,603,754 B2 | 3/2020 | Witter et al. | B23Q 11/0071 | |
| 2002/0168241 A1 * | 11/2002 | David | B23Q 9/0042 | 409/178 |
| 2002/0182023 A1 * | 12/2002 | Lai | B23Q 5/06 | 409/137 |
| 2008/0156396 A1 * | 7/2008 | Cooper | B25F 5/02 | 144/136.95 |
| 2010/0089497 A1 | 4/2010 | Keenan | 144/252.1 | |
| 2013/0051951 A1 * | 2/2013 | Friegang | B27C 5/10 | 409/137 |
| 2016/0250731 A1 * | 9/2016 | Wong | B25F 5/026 | 408/56 |
| 2017/0197286 A1 * | 7/2017 | Sheldon | A46B 15/0053 | |
| 2024/0100641 A1 * | 3/2024 | Limberg | B23Q 11/0071 | |
| 2024/0100732 A1 * | 3/2024 | Roloff | B27C 5/10 | |
| 2025/0091192 A1 * | 3/2025 | Lauer | B27C 5/10 | |

FOREIGN PATENT DOCUMENTS

DE 102017203278 9/2018

* cited by examiner

*Primary Examiner* — Omar Flores Sanchez
(74) *Attorney, Agent, or Firm* — Bauer & Joseph

(57) ABSTRACT

A beveler device is configured for removable attachment to a hand-held power unit and to simultaneously de-burr and bevel the raw cut edge of a PVC pipe. An adapter may be attached to the beveler device and connect a vacuum hose for suction of chips and debris into the interior of the beveler device and out through the vacuum hose during operation.

12 Claims, 4 Drawing Sheets

HAND-HELD PIPE EDGE BEVELER WITH VACUUM ADAPTER

PRIORITY CLAIM

This application is a continuation-in-part of U.S. patent application Ser. No. 15/487,481 filed on Apr. 14, 2017, which is hereby incorporated by reference in its entirety.

FIELD OF THE INVENTION

The present invention is directed to the field of hand tools. More particularly, the present invention is directed to a hand-held beveler attachment device for simultaneously de-burring and beveling the cut edge of a PVC pipe.

BACKGROUND

PVC pipes frequently have to be cut to various lengths and joined together at a worksite. It is frequently desirable to cleanly connect and cement one PVC pipe to an adjacent length of pipe, elbow, etc. Cutting the end of a PVC pipe will typically leave a rough, burred edge around the periphery of the cut edge. If not removed, the burrs on the cut edge will interfere with a clean connection. The cut edge of a pipe is also sometimes beveled to further facilitate the clean connection to the adjacent length of pipe, elbow, etc. The pipes can be large in diameter or lengthy, making it difficult to handle the pipes so as to apply the cut edge of the pipe to a lathe or table saw for de-burring or making a bevel cut.

BRIEF SUMMARY

It is among the objects of the preferred embodiments of the present invention to provide a hand-held pipe edge beveler attachment that facilitates the simultaneous de-burring and beveling of the cut edge of a PVC pipe of 2" diameter and larger. Another one of the objects of the preferred embodiments is the ability to make various adjustable bevel cuts to the cut edge of the PVC pipe. Another object of the preferred embodiments is to manage the dust, small chips and debris that result when the cut edge of the PVC pipe is de-burred and beveled. It is another object that the preferred embodiments that they are configured to attach to a variety of readily available hand-held power units so that they can be used to simultaneously de-burr and bevel the cut edge of a PVC pipe, even when the pipe is large, lengthy or cannot be moved. While it is conceivable that other power units could effectively be used with the beveler attachment of the preferred embodiments of the present invention, the Bosch 18v cordless die grinder with a 4.0 amp-hour-lithium-ion battery has proven to be a highly effective drive source for this attachment device.

Various other features, advantages, and characteristics of the preferred embodiments will become apparent after a reading of the following detailed description.

BRIEF DESCRIPTION OF THE DRAWINGS

The preferred embodiments of the present invention are described in conjunction with the associated drawings in which like features are indicated with like reference numerals and in which.

DETAILED DESCRIPTION OF THE PREFERRED EMBODIMENT(S)

Figure 2:
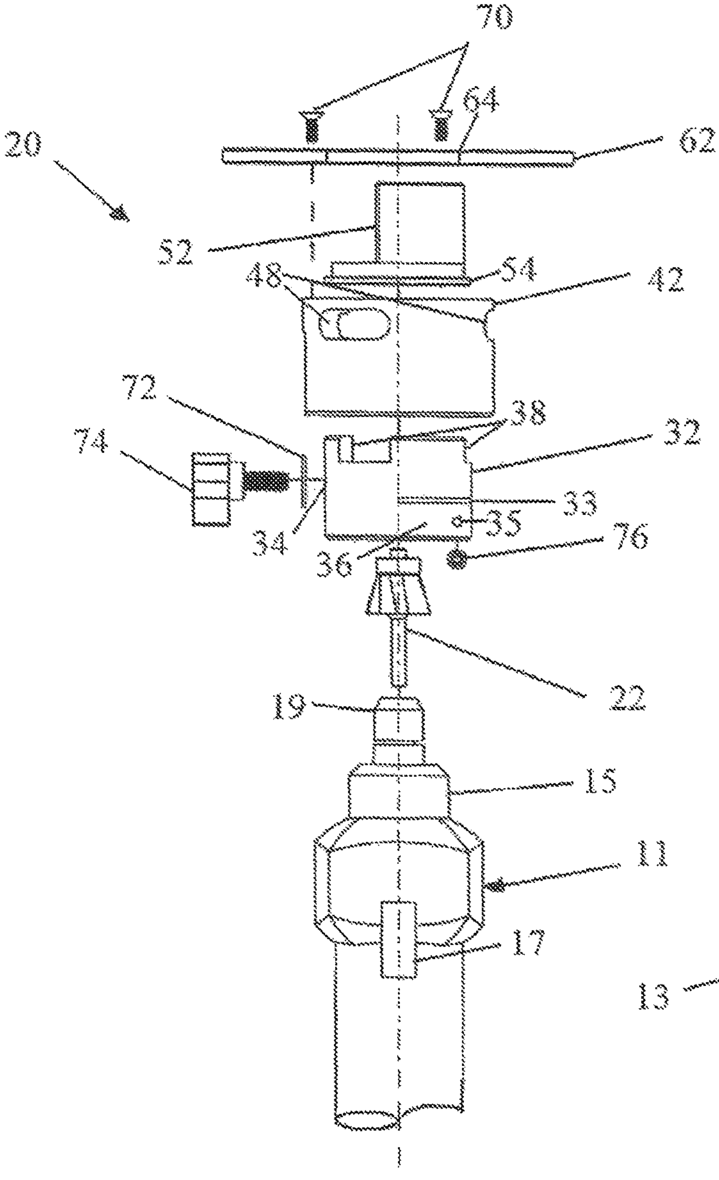
FIG. 2 is an exploded view of the first preferred embodiment of the beveler attachment.
Figure 1:
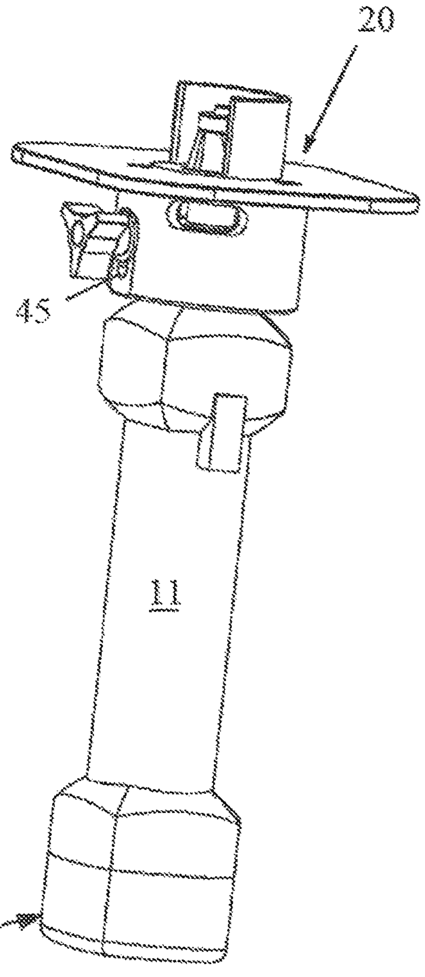
FIG. 1 is a frontal perspective view of a first preferred embodiment of the beveler attachment connected to a power unit.

A first embodiment of the cordless hand-held pipe edge beveler attachment of the present invention is depicted in FIGS. 1-2 generally at 20. The hand-held beveler attachment 20 of the present invention includes router bit 22 which is received in chuck 19 of hand-held power unit 11. While other power units may be used, it is preferred that power unit 11 comprise a Bosch 18v cordless die grinder. When the Bosch grinder is used, a 4.0 amp-hour-lithium-ion battery and charger 13 is used in conjunction therewith.

As best seen in FIG. 2, adaptor 32 has a lateral saw cut 33 as well as a vertical saw cut (not shown) forming two annular fingers 36 (one shown). Screw 76 is inserted from the back side (as seen in FIG. 2) threading into hole 35 drawing annular fingers 36 together, thereby clamping adaptor 32 onto collar 15 of hand-held grinder 11. The top of adaptor 32 has three slots 38 (two shown) in the upper rim for reasons to be enumerated shortly.

Figure 4:
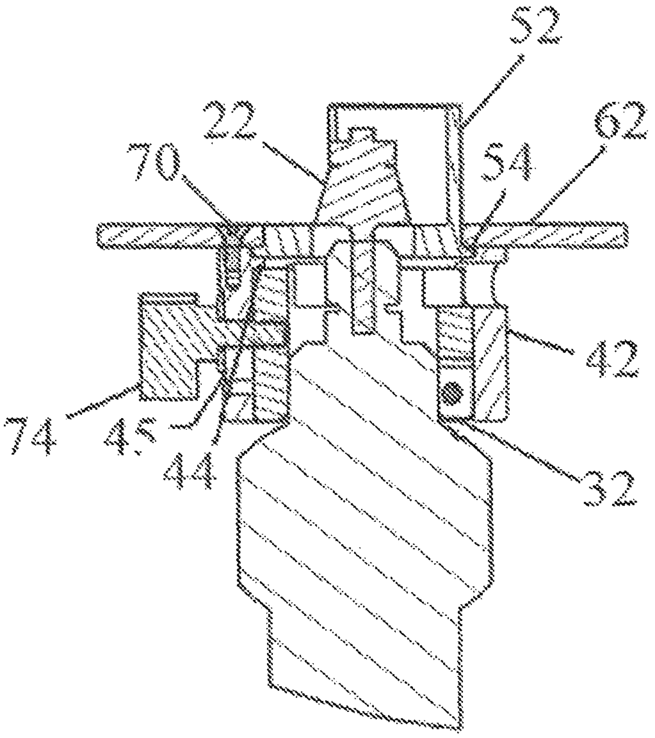
FIG. 4 is a cross-sectional front view of the fully assembled first preferred embodiment of the beveler attachment.

Adjusting ring 42 which slides over adaptor 32, has elliptical openings 48 which align with slots 38 allowing chips and debris to be centrifugally or gravitationally expelled from the adaptor 20 as they are formed during the beveling process. As best seen in FIGS. 1 and 4, adjusting ring 42 has an elongated slot 45 which allows its axial movement along the primary axis of the grinder 11.

Shroud 52 fits inside the inner periphery of adjusting ring 42 and protruding annular bottom flange 54 is seated on an inwardly directed flange 44 of adjusting ring 42. The shroud is less than a complete circle, but more than 180 degrees of a circle. While seated and fixed in the vertical direction, shroud 52 can freely rotate about the axis of rotation of the router bit 22. A hole 64 in guide plate 62 encircles shroud 52 allowing guide plate 62 to sit atop and be secured to the upper rim of adjusting ring 42 by three (two shown) flat head screws 70.

Figure 3:
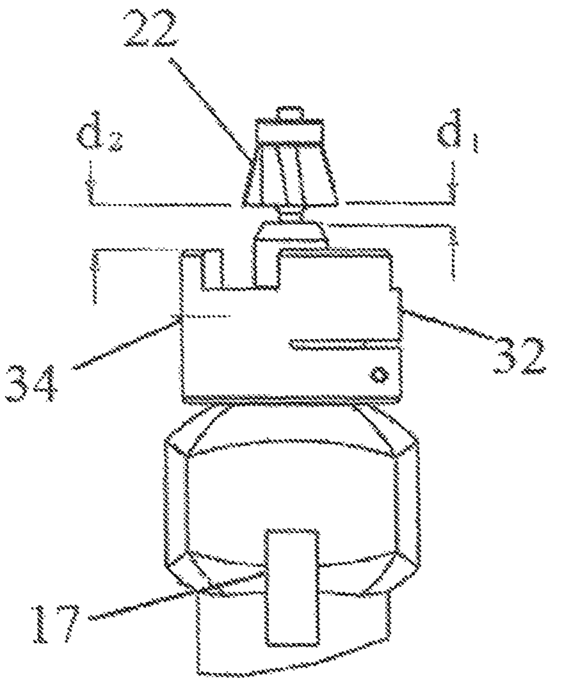
FIG. 3 is a front view of a partial assembly of the first preferred embodiment of the beveler attachment.

To mount the beveler attachment 20 to the power unit 11, the router bit 22 is secured in chuck 19 with the distance d1, i.e., the distance the bottom of bit 22 is from the top of the chuck 19, being in the range from 3⁄16" to ¼". Adaptor 32 is then secured to the power unit with the distance d2, i.e., the distance the upper rim thereof is below the bottom of bit 22, being ½", as shown in FIG. 3. The remaining elements are attached seriatim and adjustment screw 74 inserted through plate washer 72 and threaded into hole 34. When positioning adaptor 32 on the power unit 11, care must be taken to position hole 34 at a 90 degree counterclockwise from on-off switch 17.

In use, the size of the 15 degree bevel can be adjusted from 0" to ⅝" on pipe sizes 2" in diameter and larger.

Adjustment is made by loosening adjustment screw 74 and moving the bevel unit to adjust the amount of router bit 22 extending above the adjustment plate 62 to the amount desired.

Figure 5:
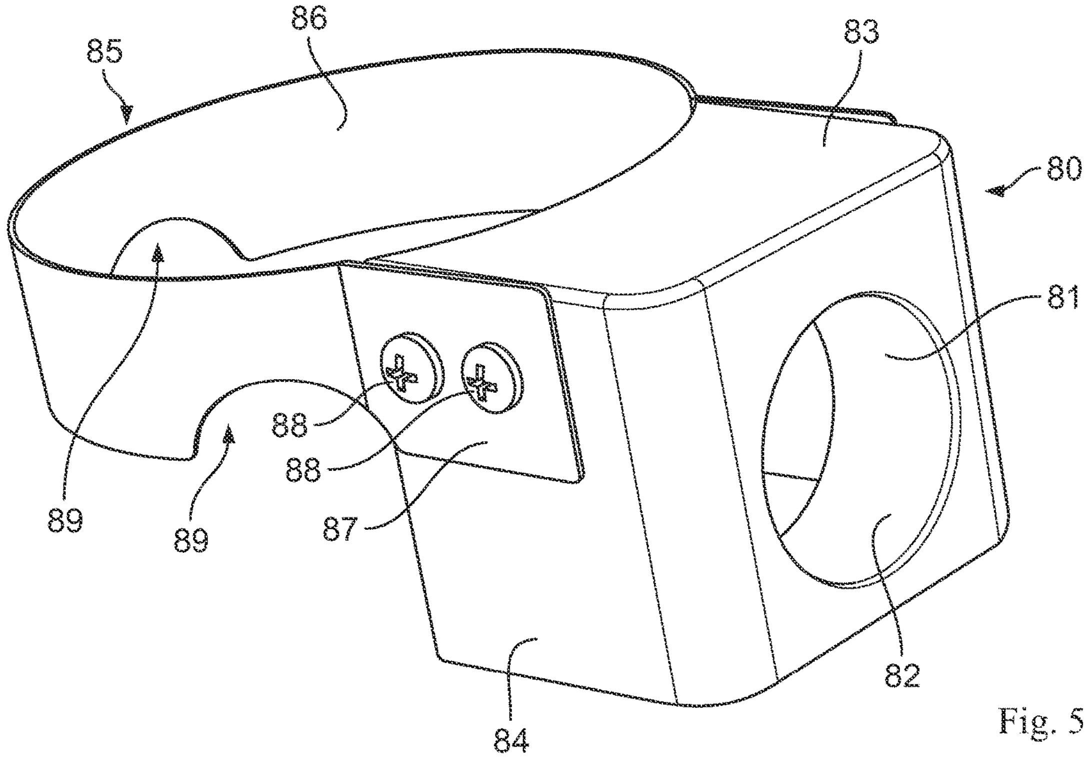
FIG. 5 is a frontal perspective view of a vacuum adapter for the beveler attachment.
Figure 7:
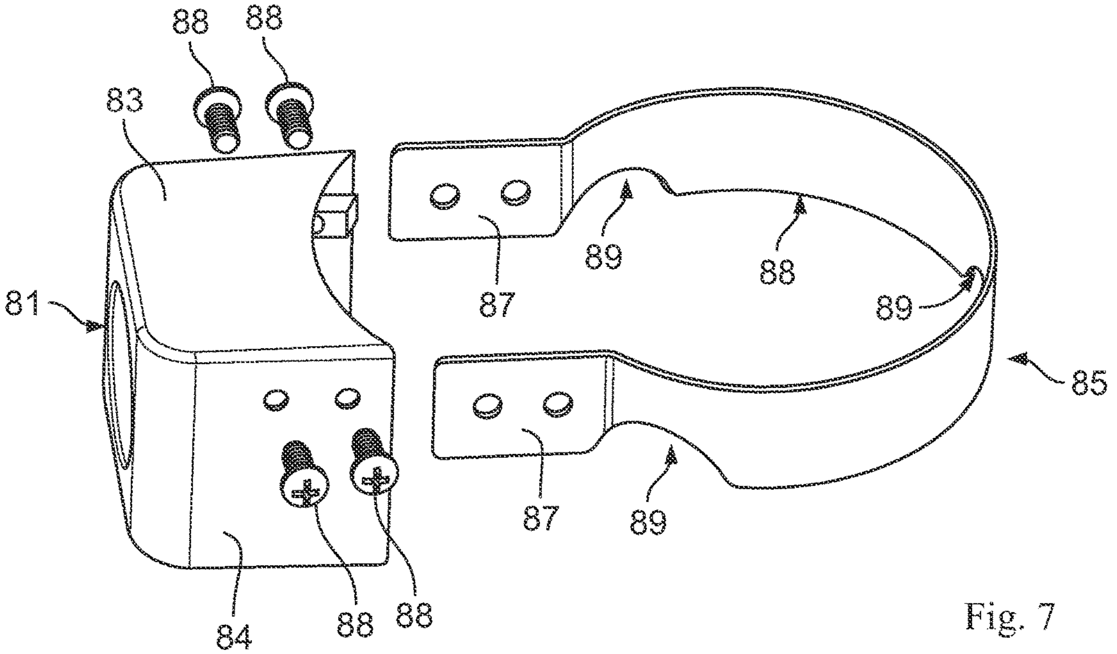
FIG. 7 is an exploded view of the vacuum adapter.
Figure 8:
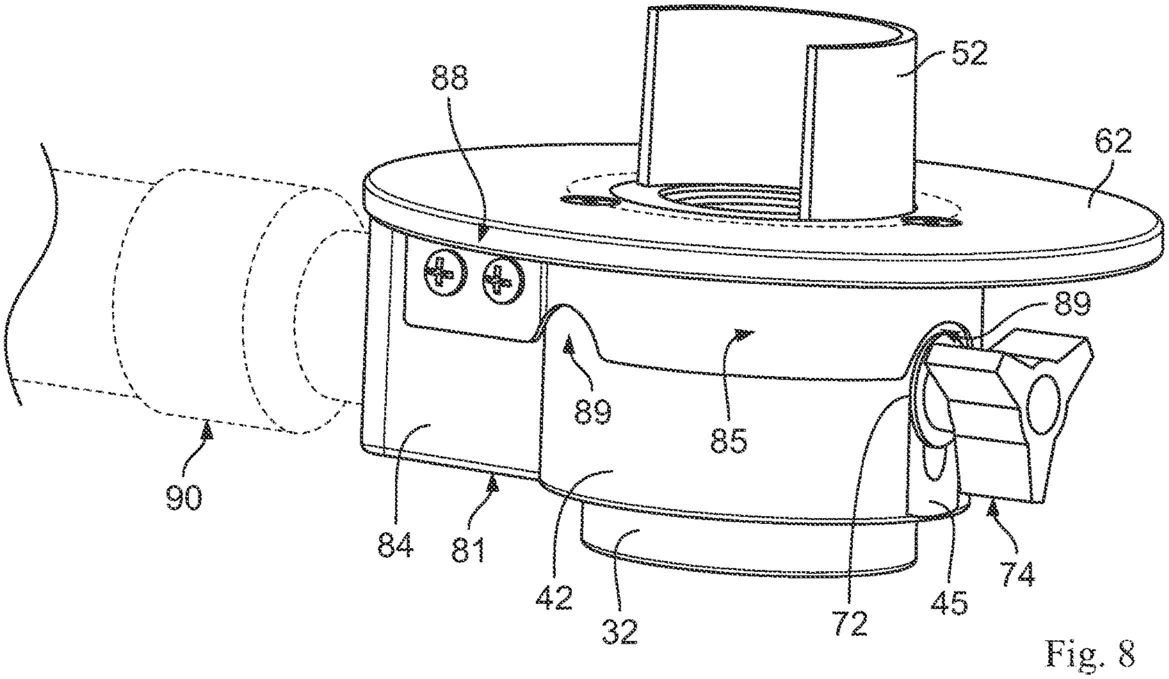
FIG. 8 shows a frontal perspective view of the second preferred embodiment with the vacuum adapter.

A second preferred embodiment is depicted in FIGS. 7-8. It is similar to the first preferred embodiment, but includes an additional vacuum adapter, indicated generally at 80 and shown in FIG. 5. The vacuum adapter 80 of the second preferred embodiments includes a vacuum box 81 with a hose connector 82 at the front face thereof. Vacuum box 81 has no rear face. The top surface 83 and bottom surface (not shown) each has a partial circular cut-out from the rear portion thereof as shown in FIG. 5, the arc of the cut-out matching the arc of the circular exterior surface of adjusting ring 42 so that there is an air-tight fit between vacuum box 81 and adjusting ring 42. The vacuum box 81 has a width, from one side surface 84 to the other, that is slightly greater than the width of the three elliptical openings 48 in adjusting ring 42.

The vacuum box is aligned with one of the three elliptical openings 48 by vacuum band element 85. The vacuum band element 85 has a circular ring portion 86 that fits around the part of the circular exterior of the adjusting ring 42 that is not abutted by vacuum box 81 and two flat strap portions 87 connected to the sides of the hose connecting element 81 by screws 88. When the screws 88 are completely tightened, the vacuum box 81 and vacuum band element 85 are secured into place on the exterior of adjusting ring 42. The circular ring portion 86 has three half-circle shaped cutouts 89 located and sized to accommodate the dimensions of the flat washer 72 and adjustment screw 74 as they are moved in elongated slot 45. This arrangement allows the vacuum box 81 to be located immediately adjacent to any one of the elliptical openings 48 in adjusting ring. When the vacuum box 81 is immediately adjacent to one of the elliptical openings 48, the other two elliptical openings 48 are covered up by circular ring portion 86 of vacuum adapter 80.

Figure 6:
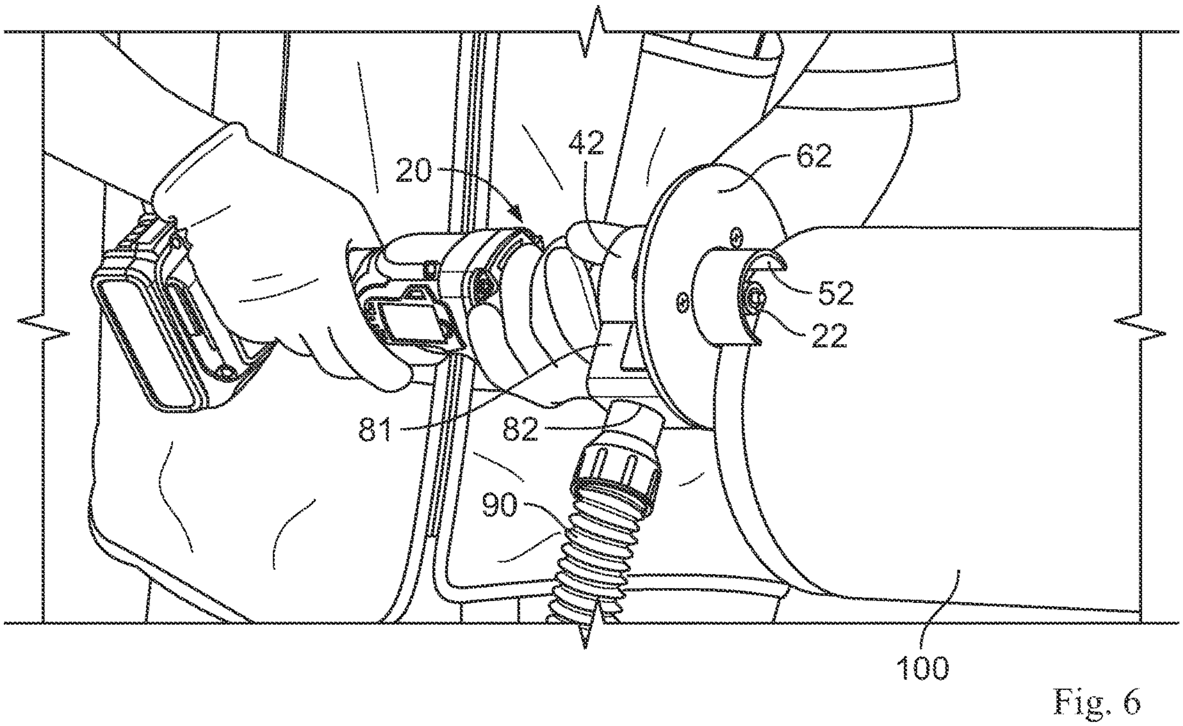
FIG. 6 shows an exemplary operation of a second preferred embodiment of the beveler with the vacuum adapter installed and connected to a vacuum hose.

FIG. 6 shows an exemplary operation of the second preferred embodiment. A vacuum hose 90, is connected to the hose connector 82 of the vacuum adapter 80. A vacuum (not shown) at the other end of vacuum hose 90 provides suction to create an airflow from the router bit 22 through the hole 64 in guide plate, down into the interior of the beveler attachment, out the slot 38 in adapter 32 and the elliptical opening 48 aligned with the hose connecting element 81 (which is preferably substantially hollow), and into vacuum hose 90. The router bit 22 of the beveler attachment is guided into contact with the cut edge of PVC pipe 100 at a perpendicular angle with the assistance of shroud 52 and guide plate 62. The airflow conveniently collects the dust, chips and debris creating when de-burring and beveling the cur edge of PVC pipe 100 into the vacuum. The operator is able to keep both hands on the beveler attachment and/or power unit as shown in FIG. 6.

Various changes, alternatives, and modifications will become apparent to a person of ordinary skill in the art after a reading of the foregoing specification. It is intended that all such changes, alternatives, and modification as fall within the scope of the appended claims be considered part of the present invention.

I claim:

1. A beveler device, comprising:

an adapter configured to removably attach the beveler device to a hand-held power tool operable to rotate a bit about an axis of rotation, to simultaneously de-burr and bevel a cut edge of a plastic pipe when engaged with said cut edge;

an adjustment ring, the adjustment ring configured to fit over and be connected to the adaptor and including a slot, wherein a connection of the adjustment ring to the adaptor through the slot determines the position of the adjustment ring in the direction parallel to the axis of rotation of the bit;

a guide plate, the guide plate configured so that the face of the guide plate lies in a plane perpendicular to the axis of rotation, the bit partially protruding from a hole in the center of the guide plate, the amount of said bit protruding from the hole in the center of said guide plate being adjusted by loosening an adjustment screw and manually adjusting the location of said guide plate along the axis of rotation of the bit; and a vacuum attachment, said vacuum attachment being removably attached to said beveler device and connecting a vacuum hose to suck chips and debris through the hole in the center of the guide plate, the interior of said adjustment ring, and out through the vacuum hose.

2. The beveler device of claim 1, further comprising a shroud seated atop an upper rim of said adaptor, fitting within said adjustment ring, and protruding through the hole in the guide plate.

3. The beveler device of claim 2, wherein the shroud is retained in a fixed position in the direction parallel to the axis of rotation by said upper rim of said adaptor and said guide plate.

4. The beveler device of claim 1, wherein the adaptor is ring shaped and has a plurality of slots in the upper rim of the adaptor periphery.

5. The beveler device of claim 4, wherein there are a plurality of openings in the periphery of the adjustment ring, and the plurality of slots in the periphery of the adaptor align with the plurality of openings in the periphery of the adjustment ring.

6. The beveler device of claim 1, wherein the adaptor has a lateral saw cut and a vertical saw cut forming two annular fingers.

7. The beveler device of claim 6, wherein the adaptor further comprises a threaded hole, whereby the adaptor is clamped to the collar of the hand-held power tool by a screw inserted into the threaded hole drawing the annular fingers together.

8. A beveler device, comprising:

an adaptor, said adaptor configured to attach said beveler device to a hand-held power tool, the hand-held power tool configured to receive, secure and rotate a working tool about an axis of rotation;

an adjustment ring, the adjustment ring configured to fit over the adaptor and including an adjustment slot having a length extending in a direction parallel to the axis of rotation and a width extending in a direction perpendicular to the axis of rotation;

an adjustment screw, the adjustment screw having a diameter smaller than the width of the adjustment slot in the adjustment ring and fitting into a threaded hole of the adaptor and, when tightened, the adjustment screw connects the adjustment ring to the adaptor;

a guide plate having a flat face and attached to the adjustment ring so that the flat face of the guide plate lies in a plane perpendicular to the axis of rotation, the guide plate having a hole centered on the axis of rotation; and a shroud, fitting within and directly abutting said adjustment ring, and protruding through the hole in the guide plate, wherein the position of said flat face of said guide plate relative to the hand-held power tool and a working tool secured in the power tool in the direction of the axis of rotation is determined by the position of the adjustment screw along the length of the adjustment slot in the adjustment ring when the adjustment screw is tightened.

9. The beveler device of claim 8, wherein the shroud is retained in a fixed position in the direction parallel to the axis of rotation.

10. The beveler device of claim 9, wherein the shroud is not attached to any part of the beveler attachment.

11. The beveler device of claim 8, wherein the adjustment ring has a plurality of openings in addition to the adjustment slot.

12. The beveler device of claim 11, wherein the plurality of openings in the adjustment ring align with a plurality of openings in the adaptor.

* * * * *